(12) United States Patent
Ito et al.

(10) Patent No.: US 10,199,179 B2
(45) Date of Patent: Feb. 5, 2019

(54) ELECTROLYTE SOLUTION FOR ELECTRIC DOUBLE LAYER CAPACITORS, AND ELECTRIC DOUBLE LAYER CAPACITOR

(71) Applicant: Panasonic Corporation, Osaka (JP)

(72) Inventors: Yasuyuki Ito, Osaka (JP); Hiroyuki Yanagisawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 582 days.

(21) Appl. No.: 14/380,419

(22) PCT Filed: Feb. 14, 2013

(86) PCT No.: PCT/JP2013/000803
§ 371 (c)(1),
(2) Date: Aug. 22, 2014

(87) PCT Pub. No.: WO2013/128824
PCT Pub. Date: Sep. 6, 2013

(65) Prior Publication Data
US 2015/0029640 A1    Jan. 29, 2015

(30) Foreign Application Priority Data
Feb. 27, 2012  (JP) .................................. 2012-039608

(51) Int. Cl.
*H01G 11/58* (2013.01)
*H01G 11/60* (2013.01)
*H01G 11/62* (2013.01)

(52) U.S. Cl.
CPC ............. *H01G 11/60* (2013.01); *H01G 11/58* (2013.01); *H01G 11/62* (2013.01); *Y02E 60/13* (2013.01)

(58) Field of Classification Search
CPC ......... H01G 11/60; H01G 11/62; H01G 11/58
USPC ........................................ 361/502, 503, 504
See application file for complete search history.

(56) References Cited

U.S. PATENT DOCUMENTS

| | | | |
|---|---|---|---|
| 6,914,768 B2 | 7/2005 | Matsumoto et al. | |
| 7,986,510 B1* | 7/2011 | Smith | H01G 11/32 252/62.2 |
| 2007/0002522 A1* | 1/2007 | Takeda | H01G 9/038 361/502 |
| 2009/0296316 A1* | 12/2009 | Shimizu | H01G 9/10 361/502 |

FOREIGN PATENT DOCUMENTS

| | | |
|---|---|---|
| JP | 09-092579 A | 4/1997 |
| JP | 2000-252168 A | 9/2000 |
| JP | 2001-167983 A | 6/2001 |

(Continued)

OTHER PUBLICATIONS

International Search Report for PCT/JP2013/000803, dated May 14, 2013.

*Primary Examiner* — Eric Thomas
*Assistant Examiner* — Arun Ramaswamy
(74) *Attorney, Agent, or Firm* — RatnerPrestia

(57) ABSTRACT

An electrolytic solution for electric double layer capacitors includes an organic solvent and quaternary ammonium salt dissolved in the organic solvent. The organic solvent consists of sulfolane and chain sulfone. The quaternary ammonium salt is at least one of diethyl dimethyl ammonium salt and ethyl trimethyl ammonium salt.

6 Claims, 1 Drawing Sheet

(56) References Cited

FOREIGN PATENT DOCUMENTS

| | | | |
|---|---|---|---|
| JP | 2004-146592 | A | 5/2004 |
| JP | 2004-186246 | A | 7/2004 |
| JP | 2007-043105 | A | 2/2007 |
| JP | 2008-171902 | A | 7/2008 |
| JP | 2008171902 | A * | 7/2008 |
| JP | 2009-054874 | A | 3/2009 |
| JP | 2013179204 | A * | 9/2013 |

* cited by examiner

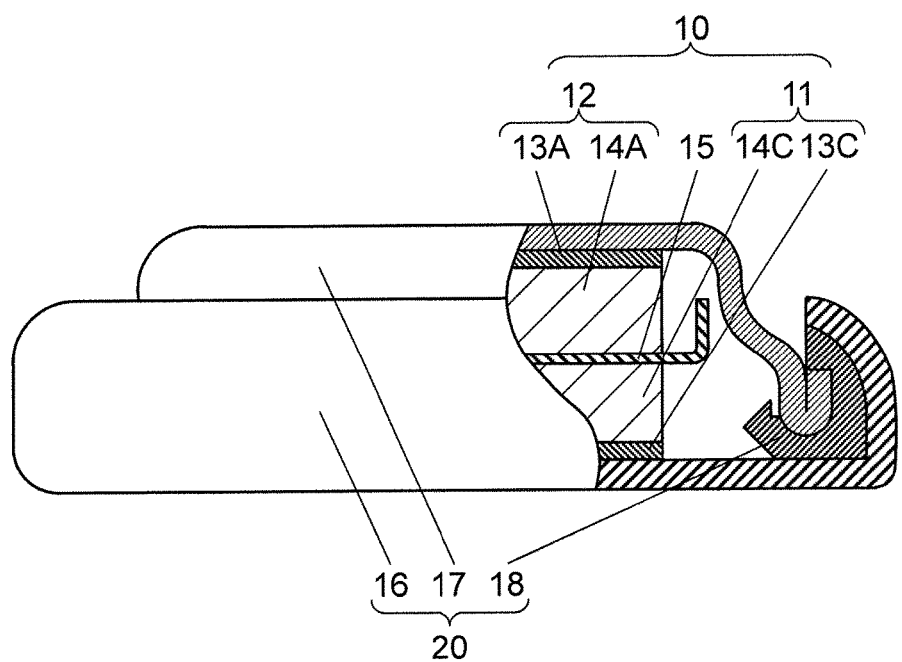

ELECTROLYTE SOLUTION FOR ELECTRIC DOUBLE LAYER CAPACITORS, AND ELECTRIC DOUBLE LAYER CAPACITOR This application is a U.S. National Phase Application of PCT International application PCT/JP2013/000803.

TECHNICAL FIELD

The present invention relates to an electrolytic solution for electric double layer capacitors used in various electronic apparatuses, and an electric double layer capacitor using the electrolytic solution.

BACKGROUND ART

An electric double layer capacitor includes an element including a positive electrode, a negative electrode, and a separator interposed between the positive and negative electrodes. The element is impregnated with an electrolytic solution prepared by dissolving an electrolyte in a solvent. Then, the element and the electrolytic solution are accommodated in a metallic case, and an opening portion of the case is sealed with a rubber sealing body.

As an electrolytic solution used for a conventional electric double capacitor, PTL 1 discloses an electrolytic solution obtained by dissolving triethyl methyl ammonium tetrafluoroborate ($TEMA.BF_4$) in an organic solvent including propylene carbonate. This electrolytic solution has excellent electric conductivity.

Furthermore, PTL 2 discloses an electrolytic solution obtained by dissolving spiro-(1,1')-bipyrrolidinium tetrafluoroborate (referred to as $SBP.BF_4$) in an organic solvent including sulfolane and chain sulfone. Use of this electrolytic solution makes it possible to produce an electric double capacitor having high heat resistance, durability and excellent withstand voltage. Moreover, deposition of chain sulfone at a low temperature can be prevented.

CITATION LIST

Patent Literature

PTL 1: Japanese Patent Unexamined Publication No. 2004.186246
PTL 2: Japanese Patent Unexamined Publication No. 2008-171902

SUMMARY OF THE INVENTION

An object of the present invention is to provide an electric double layer capacitor with reduced liquid leakage and high reliability.

An electrolytic solution for electric double layer capacitors in accordance with the present invention includes an organic solvent and quaternary ammonium salt dissolved in the organic solvent. The organic solvent consists of sulfolane and chain sulfone. The quaternary ammonium salt is at least one of diethyl dimethyl ammonium salt and ethyl trimethyl ammonium salt. Furthermore, an electric double layer capacitor using the electrolytic solution in accordance with the present invention includes a capacitor element, an accommodating part, and a sealing part. The capacitor element includes a positive electrode and a negative electrode electrically isolated from the positive electrode. The capacitor element is impregnated with the above-mentioned electrolytic solution. The accommodating part has an opening portion, and houses the capacitor element and the electrolytic solution therein. The sealing part seals the opening portion of the accommodating part.

BRIEF DESCRIPTION OF DRAWINGS

FIG. 1 is a partially cut-away side view of an electric double layer capacitor in accordance with the exemplary embodiment of the present invention.

DESCRIPTION OF EMBODIMENTS

An electrolytic solution is alkalized with a small amount of moisture in the electrolytic solution when a voltage is applied in a high-temperature environment or a high-humidity environment. In a conventional electric double layer capacitor, a rubber sealing body is deteriorated due to this alkalization, an electrolytic solution leaks out, which may have a bad influence on a circuit board.

Hereinafter, an exemplary embodiment of the present invention is described with reference to FIG. 1. FIG. 1 is a partially cut-away side view of an electric double layer capacitor in accordance with the exemplary embodiment of the present invention. FIG. 1 shows a coin-shaped electric double layer capacitor.

The electric double layer capacitor includes capacitor element 10, an electrolytic solution (not shown), accommodating part 20, and sealing part 18. Capacitor element 10 is formed by laminating positive electrode 11, negative electrode 12, and separator 15 interposed between positive electrode 11 and negative electrode 12. Capacitor element 10 is impregnated with the electrolytic solution. Accommodating part 20 is provided with an opening portion, includes case 16 and lid 17, and houses capacitor element 10 and the electrolytic solution. Sealing part 18 seals the opening portion provided to accommodating part 20.

Herein, a procedure for assembling the electric double layer capacitor shown in FIG. 1 is described shortly. Firstly, capacitor element 10 is formed. Thereafter, capacitor element 10 is impregnated with the electrolytic solution. Then, capacitor element 10 and the electrolytic solution with which capacitor element 10 is impregnated are housed in accommodating part 20 including case 16 and lid 17. Note here that a ring-shaped gasket as sealing part 18 is disposed at an end portion of the opening portion of accommodating part 20. Then, sealing part 18 is compressed by caulking case 16 so as to seal accommodating part 20. In this state, positive electrode 11 electrically communicates with case 16 via current collector 13A, and negative electrode 12 electrically communicates with lid 17 via current collector 13C. An electric double layer capacitor is thus produced. Furthermore, outer terminals may be coupled to case 16 and lid 17, respectively.

Positive electrode 11 includes electrically conductive current collector 13A and polarizable electrode layer 14A provided on current collector 13A. Similarly, negative electrode 12 includes electrically conductive current collector 13C and polarizable electrode layer 14C provided on current collector 13C. Polarizable electrode layers 14A and 14C are made of a mixture obtained by uniformly mixing activated carbon powder, electrically conductive material such as carbon black, and a binder.

Circular case 16 and lid 17 are made of austenitic stainless steel such as SUS316 and SUS316L, and austenitic ferritic double-phase stainless steel. Use of such material allows excellent corrosion resistance to be achieved under the application of a high voltage.

Sealing part 18 is formed of insulating elastic resin. Specific examples of resin material of sealing part 18 include thermoplastic resin having heat resistance, for example, polypropylene (PP), polyphenylene sulfide (PPS), polyether ether ketone (PEEK), and polyalylate (PAR) resin. Furthermore, butyl rubber having high elasticity can be used.

The electrolytic solution is prepared by dissolving electrolyte in a solvent. In this exemplary embodiment, the electrolyte is at least one of quaternary ammonium salts selected from diethyl dimethyl ammonium salt and ethyl trimethyl ammonium salt, and the solvent is an organic solvent containing sulfolane and chain sulfone. That is to say, the electrolytic solution includes an organic solvent, and quaternary ammonium salt dissolved in the organic solvent. The organic solvent contains sulfolane and chain sulfone. The quaternary ammonium salt is at least one of diethyl dimethyl ammonium salt and ethyl trimethyl ammonium salt.

Note here that the organic solvent is substantially made of only sulfolane and chain sulfone. That is to say, the organic solvent substantially consists of sulfolane and chain sulfone. However, it may include a small amount of other substances.

When diethyl dimethyl ammonium salt and ethyl trimethyl ammonium salt are used in a state in which they are dissolved in the above-mentioned organic solvent, liquid leakage can be remarkably suppressed in a high temperature load environment or a high humidity load environment as compared with generally used quaternary ammonium salt such as triethyl methyl ammonium salt and tetraethyl ammonium salt, and pyrrolidinium salt.

In the organic solvent, a weight percentage of sulfolane with respect to a total weight of sulfolane and chain sulfone is preferably 60% or more and 90% or less, and more preferably 65% or more and 80% or less. When an organic solvent having such a weight percentage is used, liquid leakage can be remarkably suppressed and reliability can be enhanced.

Furthermore, an electrolytic solution obtained by dissolving diethyl dimethyl ammonium salt or ethyl trimethyl ammonium salt in an organic solvent containing sulfolane and chain sulfone has excellent withstand voltage. The withstand voltage is evaluated by a degree of deterioration of the characteristics of an electric double layer capacitor in a high-temperature load environment in which a high voltage is applied. The high-temperature load environment includes an environment temperature of 55° C. to 85° C., an applied voltage of 2.5 V or more, and more preferably 2.8 V or higher and 3.5 V or lower.

As a counter anion for a quaternary ammonium cation, well-known anions may be used and are not particularly limited. Examples of such counter anions include fluoride ions such as $BF_4^-$, $PF_6^-$, $AsF_8^-$, and $SbF_8^-$, $N(CF_3SO_3)_2^-$, $RfSO_3^-$ (Rf denotes a fluoroalkyl group having 1-12 carbon atoms), $C(CF_3SO_3)_3^-$, $F^-$, $ClO_4^-$, $AlF_4^-$, $SiF_6^-$, $CN^-$, and $F(HF)_n^-$ (n denotes an integer of 1 to 4). Among them, $BF_4^-$ is preferable because of its excellent heat-resistance and electrical conductivity.

Examples of the chain sulfone include dimethyl sulfone, ethyl methyl sulfone, diethyl sulfone, propyl methyl sulfone, isopropyl methyl sulfone, propyl ethyl sulfone, isopropyl ethyl sulfone, dipropyl sulfone, diisopropyl sulfone, and the like. Any one of these sulfones may be used, or two or more types of sulfones may be used in combination. Note here that as the chain sulfone, dimethyl sulfone and ethyl methyl sulfone are preferable because they have excellent withstand voltage. Furthermore, ethyl methyl sulfone is more preferably because it has an excellent low-temperature characteristic.

The concentration of the above-mentioned quaternary ammonium salt in the electrolytic solution can be made in a range in which the quaternary ammonium salt can be dissolved in the organic solvent. The concentration of diethyl dimethyl ammonium salt is preferably 0.5 mol/liter or more and 2.2 mol/liter or less. The concentration of ethyl trimethyl ammonium salt is preferably 0.5 mol/liter or more and 1.1 mol/liter. Furthermore, diethyl dimethyl ammonium salt is dissolved in an organic solvent of sulfolane and chain sulfone more easily as compared with ethyl trimethyl ammonium salt, so that it is excellent in view of electrical conductivity.

The moisture in the electrolytic solution is preferably limited to 100 ppm or less in order to enhance liquid leakage resistance. Note here that the water content in the electrolytic solution can be measured by the Karl Fischer method.

In the above description, a coin-shaped electric double layer capacitor is described as an example, but the present invention is not limited to this example. For example, the invention may be applied to a cylindrical-shaped electric double layer capacitor. A cylindrical-shaped electric double layer capacitor includes a capacitor element obtained by winding positive and negative electrodes each having a current collector to which an extension lead is coupled with a separator interposed between the positive and negative electrodes. The capacitor element and an electrolytic solution are housed in a bottomed cylindrical-shaped case constituting an accommodating part and made of metal such as aluminum. Then, a disk-shaped sealing part is disposed to an end portion of the opening portion of the case and the sealing part is compressed by caulking. Thus, the opening portion of the case sealed. Furthermore, the extension leads derived from the capacitor element is inserted into through-holes provided to the sealing part and exposed to the outside. Thus, an electric double layer capacitor is formed.

The sealing part in the cylindrical-shaped electric double layer capacitor is made of resin material such as ethylene propylene rubber, or butyl rubber (isobutylene isoprene rubber), styrene-butadiene rubber, butadiene rubber, and polyisobutylene rubber. Among them, peroxide-vulcanized butyl rubber having excellent airtightness is preferable.

Hereinafter, effects of this exemplary embodiment are described with reference to specific examples. Note here that the present invention is not limited to these examples.

(Sample EA)

In sample EA, an electrolyte is diethyl dimethyl ammonium tetrafluoroborate ($DEDMA.BF_4$), and an organic solvent is a mixture of sulfolane (SL) and ethyl methyl sulfone (EMS). A weight percentage of SL with respect to a total weight of SL and EMS is 70%. Furthermore, the concentration of the electrolyte is 1.5 mol/liter, and the moisture in this electrolytic solution is 20 ppm.

Polarizable electrode layers 14C and 14A are produced as follows. Firstly, coconut husk activated carbon powder having an average particle diameter of 5 μm, carbon black as a conductive agent having an average particle diameter of 0.05 μm, and a polytetrafluoroethylene binder are mixed with each other to obtain a mixture. Water as a dispersion medium is added to the mixture if necessary, and the mixture is sufficiently kneaded by using a kneader to prepare paste. The paste is molded into a sheet shape. The molded product is dried in the air at 120° C. to 200° C., punched and formed into a disk shape. Thus, polarizable electrode layers 14C and 14A are produced.

Current collectors 13C and 13A are produced with, for example, carbon. Specifically, carbon paste obtained by mixing graphite and a binder is coated onto the inside of lid 17 and case 16, respectively, and dried.

Lid 17 is formed of SUS304 material having a thickness of 0.1 mm, and case 16 is formed of austenitic stainless steel having a thickness of 0.1 mm. Note that the austenitic stainless steel constituting case 16 contains 20-40 weight % Ni, 20-30 weight % Cr, and 5-10 weight % Mo.

Furthermore, a ring-shaped gasket of PEEK is disposed as sealing part 18 between a bent portion formed on an outer peripheral portion of lid 17 and an outer peripheral portion of case 16. On the other hand, polarizable electrode layers 14C and 14A and separator 15 are impregnated with an electrolytic solution which has been prepared in advance. Then, polarizable electrode layer 14A, separator 15, and polarizable electrode layer 14C are laminated on current collector 13A, sequentially, and capacitor element 10 impregnated with the electrolytic solution is housed in lid 17 and case 16.

Next, the tip end of the outer peripheral portion of case 16 is curled so as to wrap the bent portion of lid 17 with sealing part 18 from the outside and hermetic sealing is carried out. As mentioned above, a coin-shaped electric double layer capacitor having a diameter of 3.8 mm and a height of 1.1 mm is produced.

(Samples EB, EC, and ED)

In each of samples EB, EC, and ED, an electric double layer capacitor is produced in the same manner as in sample EA except that the weight percentage of SL with respect to the total weight of SL and EMS is 85%, 80%, and 65%, respectively.

(Samples EE and EF)

In each of samples EE and EF, an electric double layer capacitor is produced in the same manner as in sample EA except that ethyl trimethyl ammonium tetrafluoroborate (ETMA.BF$_4$) having a concentration of 1.0 mol/liter is used instead of DEDMA.BF$_4$ in sample EA and the weight percentage of SL with respect to the total weight of SL and EMS in samples EE and EF is 70% and 80%, respectively.

(Sample EG)

In sample EG, an electric double layer capacitor is produced in the same manner as in sample EA except that dimethyl sulfone (DMS) is used instead of EMS of sample EA and the weight percentage of SL with respect to a total weight of SL and DMS is 70%.

(Sample CA)

In sample CA, an electric double layer capacitor is produced in the same manner as in sample EA except that the organic solvent does not contain EMS, that is to say, the weight percentage of SL with respect to the total weight of SL and EMS is 100%.

(Sample CB)

In sample CB, an electric double layer capacitor is produced in the same manner as in sample EA except that quaternary ammonium salt of TEMA.BF$_4$ is used instead of DEDMA.BF$_4$ of sample EA.

(Sample CC)

In sample CC, an electric double layer capacitor is produced in the same manner as in sample EA except that quaternary ammonium salt of tetraethyl ammonium tetrafluoroborate (TEA.BF$_4$) having a concentration of 1.0 mol/liter is used instead of DEDMA.BF$_4$ of sample EA.

(Sample CD)

In sample CD, an electric double layer capacitor is produced in the same manner as in sample EA except that SBP.BF$_4$ is used instead of DEDMA.BF$_4$ in the electrolytic solution of sample EA and the weight percentage of SL with respect to the total weight of SL and EMS is 80%.

Next, coin-shaped electric double layer capacitors of samples EA to EG and samples CA to CD are evaluated for liquid leakage resistance, voltage resistance, and low-temperature characteristics. Examination results are shown in Table 1.

For the evaluation of the liquid leakage resistance, voltage of 3.3 V is applied to 50 test cells for each sample at a temperature of 60° C. and in a humidity of 90% RH to 95% RH. The liquid leakage is evaluated after such a high humidity load test is carried out for 1000 hours. The applied voltage when the liquid leakage resistance is evaluated is the same as an applied voltage when the withstand voltage is evaluated described after.

Note here that for the evaluation of the liquid leakage, test cells are visually observed from the lid side so as to determine whether or not leaking points of the electrolytic solution and corroded points of the case due to the liquid leakage are observed. A failure product rate (%) of the liquid leakage is obtained, wherein test cells having no leaking points and no corroded points are defined as a normal product and test cells having a leaking point or a corroded point are defined as a failure product.

For the evaluation of the voltage resistance, a high-temperature load test in which a voltage of 3.3 V is applied at a temperature of 70° C. is carried out. In this high-temperature load test, initial capacitance values and capacitance values after 1000 hours have passed are measured at 25° C. with respect to 50 test cells for each sample. The average value of the initial values, and the average value of change rates (%) from the initial value to the value after 1000 hours have passed are measured.

In order to evaluate capacitance at 25° C., the test cells are charged out with a constant voltage of 3.3 V for 60 minutes, and discharged with a constant current of 10 µA after one minute have passed after the charging. The capacitance is obtained from a time during which a discharge curve at this time is dropped to 2.0 V from 3.3V.

In order to evaluate the low-temperature characteristics, for 20 test cells for each sample in the initial stage after the test cells are produced, capacitances at 25° C. and −20° C. are measured. Then, the average value of the change rates (%) of the capacitance at −20° C. with respect to the capacitance at 25° C. is obtained. Note here that capacitance at −20° C. is obtained in the same manner as in the above-mentioned capacitance at 25° C. mentioned above except that the temperature is changed from 25° C. to −20° C.

TABLE 1

| sample | electrolyte | concentration (mol/L) | chain sulfone | SL weight percentage | leakage resistance occurrence (%) | voltage resistance initial stage (F) | voltage resistance change rate (%) | low temperature change rate (%) |
|---|---|---|---|---|---|---|---|---|
| EA | DEDMA•BF$_4$ | 1.5 | EMS | 70 | 0 | 0.0238 | −18 | −29 |
| EB | DEDMA•BF$_4$ | 1.5 | EMS | 85 | 0 | 0.0240 | −20 | −28 |
| EC | DEDMA•BF$_4$ | 1.5 | EMS | 80 | 0 | 0.0235 | −18 | −28 |

TABLE 1-continued

| sample | electrolyte | concentration (mol/L) | chain sulfone | SL weight percentage | leakage resistance occurrence (%) | voltage resistance initial stage (F) | voltage resistance change rate (%) | low temperature change rate (%) |
|---|---|---|---|---|---|---|---|---|
| ED | DEDMA•BF$_4$ | 1.5 | EMS | 65 | 0 | 0.0243 | −19 | −31 |
| EE | ETMA•BF$_4$ | 1.0 | EMS | 70 | 0 | 0.0232 | −19 | −31 |
| EF | ETMA•BF$_4$ | 1.0 | EMS | 80 | 0 | 0.0238 | −19 | −30 |
| EG | DEDMA•BF$_4$ | 1.5 | DMS | 70 | 0 | 0.0243 | −23 | −47 |
| CA | DEDMA•BF$_4$ | 1.5 | — | 100 | 16 | 0.0235 | −19 | −100 |
| CB | TEMA•BF$_4$ | 1.5 | EMS | 70 | 100 | 0.0217 | −23 | −51 |
| CC | TEA•BF$_4$ | 1.0 | EMS | 70 | 100 | 0.0202 | −40 | −63 |
| CD | SBP•BF$_4$ | 1.5 | EMS | 80 | 90 | 0.0224 | −24 | −25 |

As shown in Table 1, for the liquid leakage resistance, as in samples EA to ED, when an electrolytic solution obtained by dissolving DEDMA.BF$_4$ in a mixed solvent of SL and EMS is used, the failure rate of the liquid leakage can be made to be 0%. Therefore, these samples have more excellent liquid leakage resistance as compared with samples CA to CD.

On the other hand, as in samples CA to CD, when the failure rate of the liquid leakage is high, the amount of liquid leakage of the electrolytic solution is increased, which may cause failure in a circuit board.

Furthermore, the test cells after the high-humidity load test are observed from the lid 17 side with enlarged by using a magnifier of 30× magnification. In sample EB, a length of the above-mentioned leaking point and the above-mentioned corroded point along the circumference of the outer shape of the case is about 2% with respect to the whole circumferential length. However, samples EA, EC, and ED have no leaking point and no corroded point. The results show that when the weight percentage of SL is 65% or more and 80% or less, extremely excellent liquid leakage resistance can be obtained.

Furthermore, as in samples EE and EF, also in a case in which ETMA.BF$_4$ is used as an electrolyte, and the weight percentage of SL is 70% and 80%, the failure rate of the liquid leakage is 0%. Furthermore, as in sample EG, also in a case in which DEDMA.BF$_4$ is used, DMS is used as chain sulfone, and the weight ratio of SL is 70%, the failure rate of the liquid leakage is 0%. In addition, also when samples EE, EF, and EG are observed by using a magnifier, the leaking point of the electrolytic solution and the corroded point of the case are not observed.

Note here that before the high-humidity load test for evaluating the liquid leakage resistance, liquid leakage is not observed in any test cells.

Furthermore, as in samples EA to EF, an electrolytic solution obtained by dissolving DEDMA.BF$_4$ or ETMA.BF$_4$ in a mixed solvent of SL and EMS is used, voltage resistance and low-temperature characteristics are excellent. The low-temperature characteristic is more excellent in sample CD. However, the low low-temperature characteristic of sample EG is as low as that in sample CB and sample CC.

As mentioned above, when an electrolytic solution obtained by dissolving quaternary ammonium salt that is at least one of diethyl dimethyl ammonium salt and ethyl trimethyl ammonium salt in an organic solvent containing sulfolane and chain sulfone is used, an electric double layer capacitor having excellent liquid leakage resistance and high reliability can be produced.

The reason why the liquid leakage resistance is improved when the above-mentioned electrolytic solution is used is not clarified. As mentioned above, when a voltage is applied to an electric double layer capacitor in a high-temperature environment or in a high-humidity environment, alkali is generated due to a small amount of moisture in the electrolytic solution. It seems that the alkali generated by the combination as mentioned above and an electrolytic solution component are reacted with each other to allow the alkali to disappear.

On the other hand, even when similar quaternary ammonium salt such as TEMA.BF$_4$ and TEA.BF$_4$ is used, as in samples CB and CC, the liquid leakage resistance is poor. Furthermore, also in a case in which the organic solvent includes neither SL nor chain sulfone, the liquid leakage resistance is poor as in sample CA. Therefore, it is experimentally demonstrated from the results of Table 1 that the liquid leakage resistance is improved only by the above-mentioned electrolytic solution composition.

INDUSTRIAL APPLICABILITY

An electric double layer capacitor using an electrolytic solution in accordance with the present invention has excellent liquid leakage resistance. Therefore, it is particularly useful for an electric double layer capacitor used in harsh environmental conditions in, for example, applications of automobiles.

The invention claimed is:
1. An electric double layer capacitor comprising:
a capacitor element including a positive electrode and a negative electrode electrically isolated from the positive electrode;
an electrolytic solution with which the capacitor element is impregnated;
an accommodating part housing the capacitor element and the electrolytic solution and having an opening portion; and
a sealing part sealing the opening portion of the accommodating part, wherein:
the electrolytic solution includes:
an organic solvent including sulfolane and ethyl methyl sulfone; and
quaternary ammonium salt dissolved in the organic solvent and being at least one of diethyl dimethyl ammonium salt and ethyl trimethyl ammonium salt,
a weight percentage of the sulfolane in a total of the sulfolane and the ethyl methyl sulfone in the electrolytic solution is 60% or more and 80% or less, the accommodating part includes a case made of metal,
the sealing part is made of elastic resin, and
the opening portion of the accommodating part is sealed by compressing the sealing part with the case.

2. The electric double layer capacitor according to claim 1, wherein a concentration of diethyl dimethyl ammonium salt is 0.5 mol/liter or more and 2.2 mol/liter or less when diethyl dimethyl ammonium salt is used as the quaternary ammonium salt, and a concentration of ethyl trimethyl ammonium salt is 0.5 mol/liter or more and 1.1 mol/liter or less when ethyl trimethyl ammonium salt is used as the quaternary ammonium salt.

3. The electric double layer capacitor according to claim 1, wherein the sealing part is made of elastic resin selected from the group consisting of polypropylene resin, polyphenylene sulfide resin, polyether ether ketone resin, polyalylate resin, ethylene propylene rubber, isobutylene isoprene rubber, styrene-butadiene rubber, butadiene rubber and polyisobutylene rubber.

4. The electric double layer capacitor according to claim 1, wherein the sealing part is made of elastic resin selected from the group consisting of polyether ether ketone resin and isobutylene isoprene rubber.

5. The electric double layer capacitor according to claim 2, wherein the sealing part is made of elastic resin selected from the group consisting of polypropylene resin, polyphenylene sulfide resin, polyether ether ketone resin, polyalylate resin, ethylene propylene rubber, isobutylene isoprene rubber, styrene-butadiene rubber, butadiene rubber and polyisobutylene rubber.

6. The electric double layer capacitor according to claim 2, wherein the sealing part is made of elastic resin selected from the group consisting of polyether ether ketone resin and isobutylene isoprene rubber.

* * * * *